UNITED STATES PATENT OFFICE.

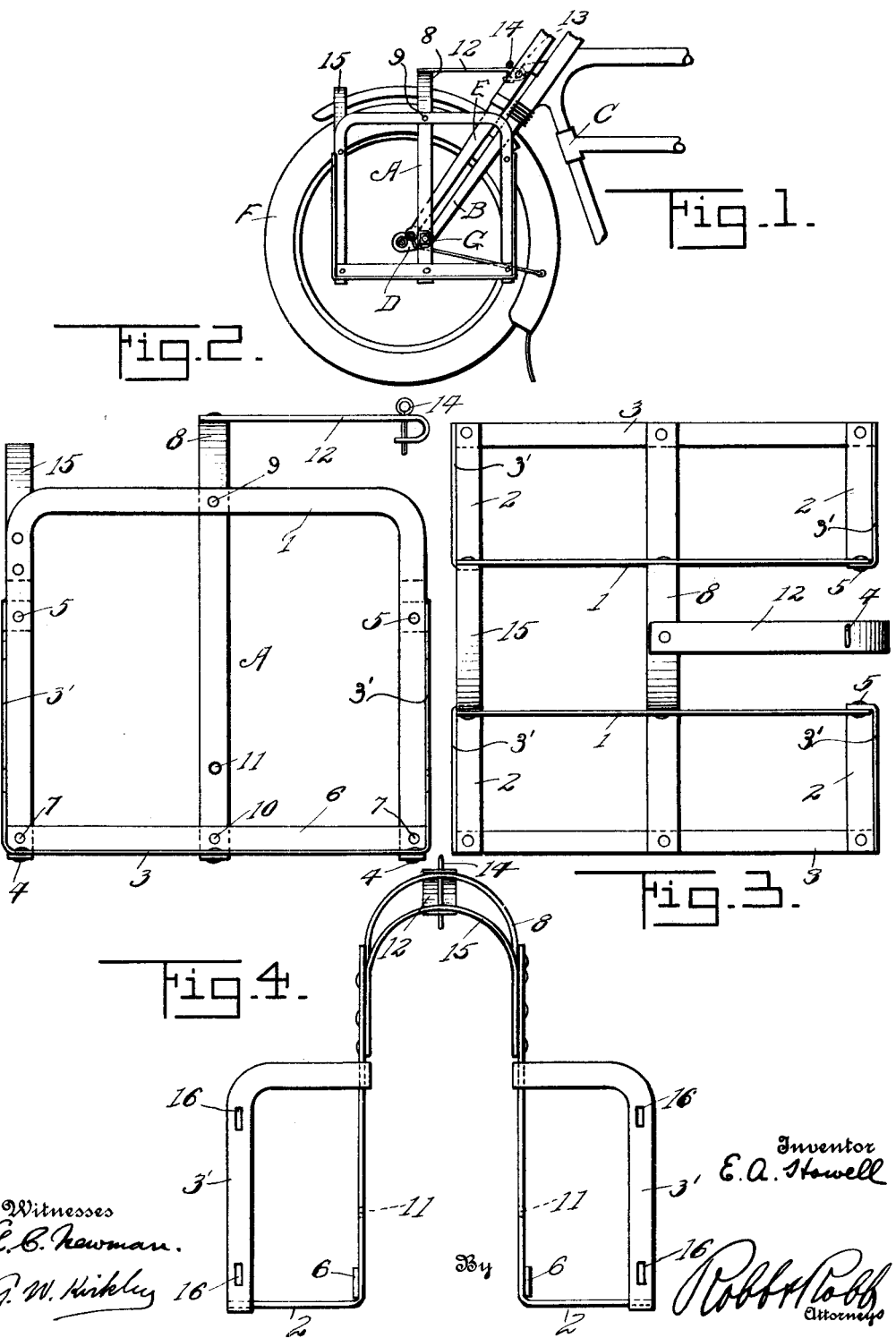

EDGAR A. HOWELL, OF TERRELL, TEXAS.

LUGGAGE-CARRIER.

1,105,435.  Specification of Letters Patent.  Patented July 28, 1914.

Application filed July 29, 1913. Serial No. 781,851.

*To all whom it may concern:*

Be it known that I, EDGAR A. HOWELL, a citizen of the United States, residing at Terrell, in the county of Kaufman and State of Texas, have invented certain new and useful Improvements in Luggage-Carriers, of which the following is a specification.

The present invention appertains to improvements in luggage carriers, and has for its main object the provision of a device of this character particularly adapted for use in conjunction with motor cycles or similar wheeled vehicles and comprising spaced frames adapted to be disposed at each side of the wheel of said vehicle and connected to the fork of the frame in such a manner that the weight carried by the carrier will be below the wheel axle, whereby an even balance of said weight will be maintained at a low point with respect to the center of gravity of the vehicle.

With the above and other objects in view, this invention consists in the construction, combination and arrangement of parts all as hereinafter more fully described, claimed and illustrated in the accompanying drawings, wherein—

Figure 1 is a fragmentary view showing the application of my carrier to a motor cycle; Fig. 2 is a side elevation of the carrier; Fig. 3 is a top plan view of the same; and Fig. 4 is an end elevation.

Throughout the following detail description, and on the several figures of the drawings, similar parts are referred to by like reference characters.

Referring to the drawings and specifically describing my invention, the letter A designates the carrier which for the purposes of illustration is connected to the frame fork B of a motor cycle C at the point where said fork is connected with the rocker arm D, which latter is also connected to the spring fork E.

It will be noted by reference to the drawings that the carrier comprises a pair of spaced baskets or frames, preferably consisting of strapped metal, the several parts of which frames are connected advantageously so as to permit the disposition at opposite sides of the wheel F, in this instance the front wheel of the motor cycle C. Each of the spaced frames aforesaid consists of a U-shaped side 1 formed by a piece of strapped metal, the ends of which are bent outwardly at right angles as indicated by the numeral 2. The outer extremities of the ends 2 are connected by means of a metallic strap 3, by means of rivets 4 or other suitable fastenings members, and said strap 3 is bent upwardly to form ends 3', the metal being bent at right angles in the same plane so as to connect to the side member 1 at the points 5 where it is fastened by means of rivets or otherwise. At the lower bends of the U-shaped side member 1 is disposed a longitudinal cross bar or brace 6 which is secured by fastening members 7 so as to hold the frame rigid longitudinally.

The frames hereinbefore described are connected by means of an arch or yoke 8 consisting of a metallic strip which is connected to the top of the side frames 1 at the point 9 and to the cross bar 6 at the bottom of the frame at the point 10, being bent so as to pass beneath the frame for connection to the strap 3. This arch 8 holds the baskets or frames in spaced relation so as to permit the disposition of the same on opposite sides of the wheel F of the vehicle C. The strap furthermore acts as a brace for the intermediate portions of the frames and is furthermore provided with openings 11 at each side, which openings are located a short distance above the bottom of each side frame.

By the removal of the nut from the bolt G connecting the rocker arm D to the fork B, the carrier may be secured to the vehicle in such a position that the weight of the contents of the frames will be at a point below the axle of the wheel F, as shown most clearly in Fig. 1 of the drawing. The carrier is held in upright position by means of a supporting bar 12 connected at one end to the top of the arch member 8 and bent at its other end to pass around the transverse bar 13 of the upper portion of the spring fork E, a suitable key 14 being employed to positively connect the bar 12 thereupon.

Connected to the outer and upper end portions of the spaced U-shaped frames is a brace 15 which prevents undue vibration of the frame members.

It will be obvious from the foregoing that the luggage carrier comprising my invention may readily be manufactured cheaply and is particularly advantageous for the reason that the weight of the contents is carried at as low a point as possible, whereby the balance of the vehicle is very readily maintained since said weight is centered at a point below the axis of rotation of the wheels. It will furthermore be apparent that the carrier may be disposed at the rear of a wheeled vehicle where it may be secured to the axle of the rear wheel, as hereinbefore described with respect to the front wheel.

Having thus described the invention, what I claim as new is:—

A luggage carrier comprising spaced frames, said frames consisting of U-shaped side members having the ends of said side members bent at an angle, bar members connecting the extremities of the side members and extending upwardly to form ends for the frames, the extremities of said bar members being bent at an angle and connected to the upper portion of the U-shaped side members, an arch connected to the side members at intermediate points of the same for holding said frames in spaced relation, the ends of said arch being bent at angles and connected to the bottoms of the frames whereby to form braces for the spaced frames, said arch member having attaching openings located at distant points from the bottoms of the frames, a supporting bar connected to the arch for holding the carrier in upright position, and a brace connected to the side members of each frame for preventing vibration of said frames.

In testimony whereof I affix my signature in presence of two witnesses.

EDGAR A. HOWELL.

Witnesses:
WADE FLEETWOOD,
SILAS WARTELSKY.

Copies of this patent may be obtained for five cents each, by addressing the "Commissioner of Patents, Washington, D. C."